US012624945B2

(12) United States Patent
Graesser et al.

(10) Patent No.: US 12,624,945 B2
(45) Date of Patent: May 12, 2026

(54) SURVEYING TARGET AND METHOD WITH LIGHT SECTOR POWER OPTIMIZATION

(71) Applicant: Trimble Inc., Westminster, CO (US)

(72) Inventors: Christian Graesser, Vallentuna (SE); Jacques Rondeau, Carquefou (FR)

(73) Assignee: Trimble Inc., Westminster, CO (US)

( * ) Notice: Subject to any disclaimer, the term of this patent is extended or adjusted under 35 U.S.C. 154(b) by 361 days.

(21) Appl. No.: 18/542,415

(22) Filed: Dec. 15, 2023

(65) Prior Publication Data

US 2024/0302166 A1 Sep. 12, 2024

(30) Foreign Application Priority Data

Mar. 10, 2023 (EP) .................................... 23161296

(51) Int. Cl.
G01C 15/00 (2006.01)
H05B 45/12 (2020.01)
G01S 19/14 (2010.01)

(52) U.S. Cl.
CPC ........... G01C 15/002 (2013.01); H05B 45/12 (2020.01); G01S 19/14 (2013.01)

(58) Field of Classification Search
CPC .................................................. G01C 15/002
(Continued)

(56) References Cited

U.S. PATENT DOCUMENTS 3,778,169 A * 12/1973 Adams ................. G01C 15/002
359/857
4,343,550 A * 8/1982 Buckley ................. G01C 15/02
248/480

(Continued)

FOREIGN PATENT DOCUMENTS

CN 101680759 B * 3/2012 ............. G01C 15/06
EP 2 150 866 A1 2/2010
(Continued)

OTHER PUBLICATIONS

Extended European Search Report for Application No. 23161296.1-1009, mailed Sep. 11, 2023, 5 pages.

*Primary Examiner* — George B Bennett
(74) *Attorney, Agent, or Firm* — Kilpatrick Townsend & Stockton LLP

(57) ABSTRACT

A target (100) for use in surveying applications is provided. The target comprises a plurality of light sources (106) arranged around a longitudinal axis (A) of a base element (108) of the target. The plurality of light sources is configured to emit light radially. The target further comprises a sensor unit (216) a control unit (214). The control unit is configured to obtain information regarding an orientation ($\alpha$) of said target relative to a surveying instrument (120) aimed at the target, based on at least a measurement received from the sensor unit. The control unit is further configured to identify, based on the obtained information regarding the orientation of the target relative to the surveying instrument, a first subset ($106_c$-$106_e$) of the plurality of light sources arranged to emit light towards the surveying instrument, and a second subset ($106_a$, $106_b$, $106_f$-$106_h$) of the plurality of light sources arranged to emit light away from the surveying instrument. The control unit is further configured to control the plurality of light sources such that the first subset of light sources emit light with a higher intensity than the second subset of light sources.

17 Claims, 3 Drawing Sheets

(58) Field of Classification Search
USPC .......................................................... 33/293
See application file for complete search history.

(56) References Cited

U.S. PATENT DOCUMENTS

| | | | | |
|---|---|---|---|---|
| 5,671,160 A * | 9/1997 | Julian | .................... | G01C 15/00 |
| | | | | 702/94 |
| 7,456,943 B1 * | 11/2008 | Goad | .................... | G01C 15/002 |
| | | | | 356/3.01 |
| 7,804,051 B2 * | 9/2010 | Hingerling | ............. | G01C 15/06 |
| | | | | 250/206.1 |
| 9,541,392 B2 * | 1/2017 | Dusha | .................... | G01C 15/06 |
| 10,119,818 B2 * | 11/2018 | Maar | .................. | G01B 11/0608 |
| 10,145,671 B2 * | 12/2018 | Khatuntsev | .......... | G01C 15/006 |
| 10,605,600 B2 * | 3/2020 | Nishita | .................... | G01S 17/66 |
| 10,921,449 B2 * | 2/2021 | Hinderling | .......... | G01C 15/002 |
| 11,898,843 B2 * | 2/2024 | Howard | ............... | G01C 15/006 |
| 2001/0019101 A1 * | 9/2001 | Ohtomo | ................. | G01C 15/06 |
| | | | | 250/206.1 |
| 2023/0184551 A1 * | 6/2023 | Reimann | ................ | G01C 15/06 |
| | | | | 702/5 |
| 2024/0110783 A1 * | 4/2024 | Nishita | ................ | G01C 15/002 |
| 2024/0191991 A1 * | 6/2024 | Mayer | .................... | G02B 23/16 |
| 2024/0302167 A1 * | 9/2024 | Graesser | ............. | G01C 15/006 |
| 2025/0231027 A1 * | 7/2025 | Rothbucher | ............. | G01C 3/30 |
| 2026/0002781 A1 * | 1/2026 | Graesser | ............. | G01C 15/006 |

FOREIGN PATENT DOCUMENTS

| | | | | |
|---|---|---|---|---|
| EP | 2 869 024 A1 | 5/2015 | | |
| EP | 4345415 A1 * | 4/2024 | .......... | G01C 15/002 |
| EP | 4428491 A1 * | 9/2024 | .......... | G01C 15/006 |

* cited by examiner

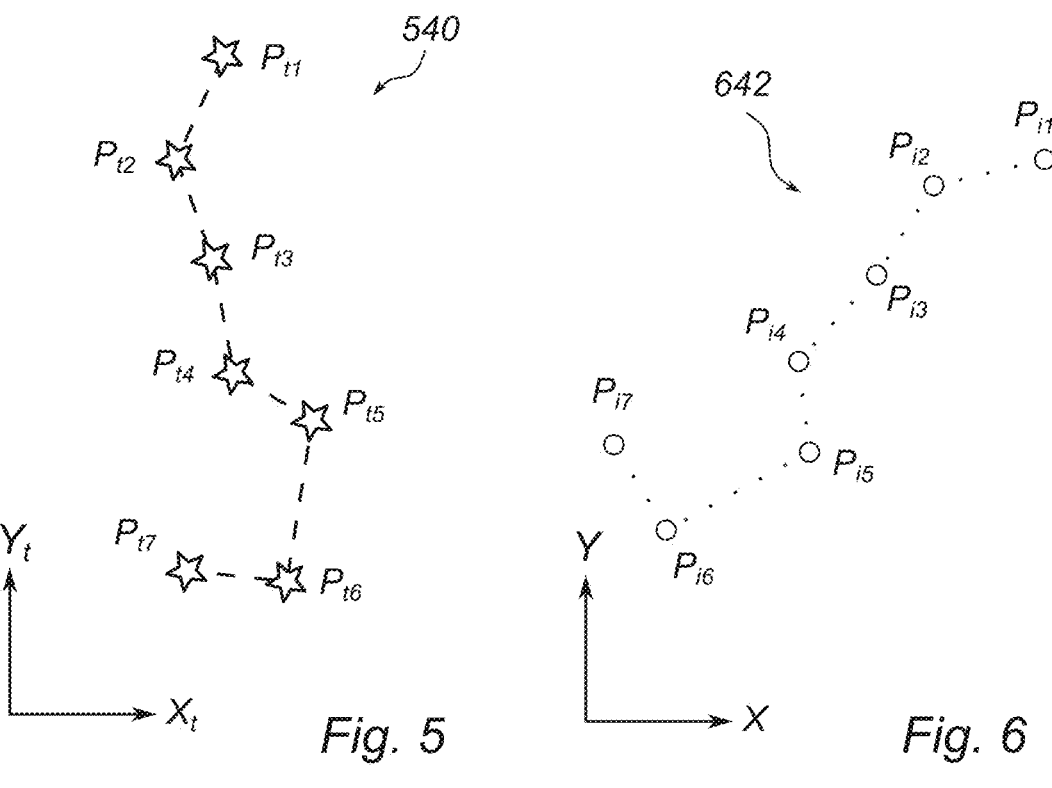
*Fig. 5*
*Fig. 6*
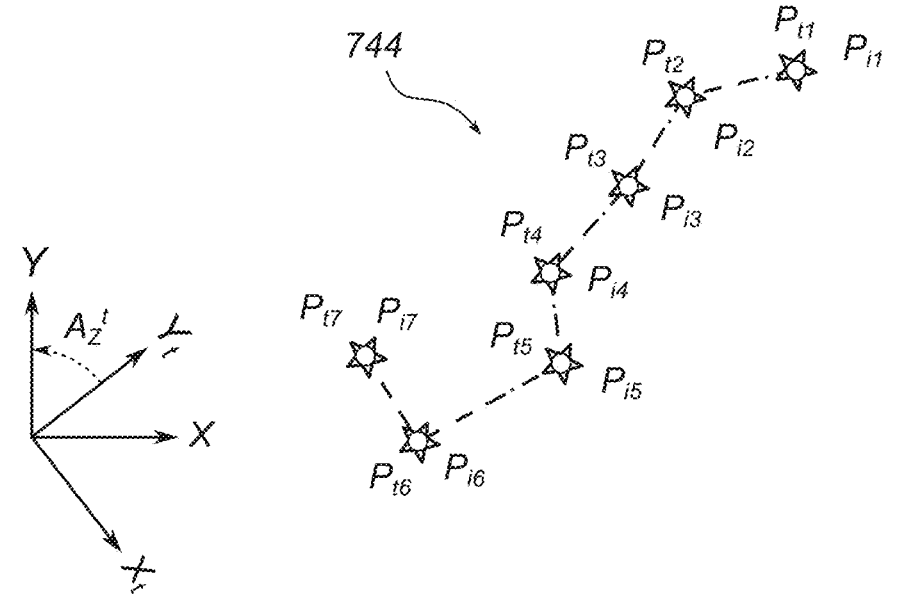
*Fig. 7*

SURVEYING TARGET AND METHOD WITH LIGHT SECTOR POWER OPTIMIZATION

CROSS-REFERENCE TO RELATED APPLICATIONS

This application claims priority to European Patent Application No. 23161296.1, filed Mar. 10, 2023, the entire contents of which are incorporated herein by reference for all purposes.

TECHNICAL FIELD

The present disclosure relates generally to the field of surveying equipment. More specifically, it relates to energy optimization in a target for use in surveying applications.

BACKGROUND

The art of surveying involves the determination of unknown positions or setting out of known coordinates using angle and distance measurements taken from one or more positions. In surveying operations, a surveying device or instrument is often used to determine one or more positions of a target. An example of such a surveying instrument is a total station which is a distance measuring instrument with an integrated distance and angular measurement unit, which combines electronic, optical and computer techniques. The surveying instrument may furthermore be provided with a computer or control unit with writable information for measurements to be performed and for storing data obtained during the measurements. Preferably, the surveying instrument, calculates the position of a target in a fixed ground-based coordinate system.

The target may emit light detectable by the surveying instrument. The surveying instrument may be configured to identify and track the target based on light emitted by the target.

SUMMARY

One general aim of the present disclosure is to optimize power consumption by the target to increase battery time and improve autonomy of the target. Specifically, there is a desire to be able to improve the control of light sources of the target.

It is therefore an object of the present invention to meet at least some of the above-mentioned goals and to provide an improved target for surveying operations and a method for operating the target.

This and other objects are achieved by means of a target and a method as defined in the appended independent claim. Other embodiments are defined by the dependent claims.

According to a first aspect of the present disclosure, a target for use in surveying applications is provided. The target comprises a plurality of light sources arranged around a longitudinal axis of a base element of the target. The plurality of light sources is configured to emit light radially. The target further comprises a sensor unit and a control unit. The control unit is configured to obtain information regarding an orientation of the target relative to a surveying instrument aimed at the target based on at least a measurement received from the sensor unit. The control unit is further configured to identify, based on the obtained information regarding the orientation of the target relative to the surveying instrument, a first subset of the plurality of light sources arranged to emit light towards the surveying instrument, and a second subset of the plurality of light sources arranged to emit light away from the surveying instrument. The control unit is further configured to control the plurality of light sources such that the first subset of light sources emit light with a higher intensity than the second subset of light sources.

According to a second aspect of the present disclosure, a method for operating a target for use in surveying operations is provided. The target comprises a plurality of light sources arranged around a longitudinal axis of a base element of the target and configured to emit light radially. The target may be a target as described with reference to the first aspect of the present disclosure.

The method comprises obtaining information regarding an orientation of the target relative to a surveying instrument aimed at the target based on at least a measurement received from a sensor unit of the target. The method further comprises identifying, based on the obtained information regarding the orientation of the target relative to surveying instrument, a first subset of the plurality of light sources arranged to emit light towards the surveying instrument, and a second subset of the plurality of light sources arranged to emit light away from the surveying instrument. The method further comprises controlling the plurality of light sources such that the first subset of light sources emit light with a higher intensity than the second subset of light sources.

The light sources may for example include light-emitting diodes (LEDs). The light sources may for example be arranged symmetrically around the longitudinal axis of the base element. The light sources may be arranged in one or more rows around the base element. The longitudinal axis may be an axis of the target which, during operation of the target, is in a substantially vertical direction. During operation, the light sources may, in some embodiments, be arranged to emit light substantially horizontally.

The surveying instrument may comprise a light detector configured to detect light emitted by the light sources, for example for identifying and/or tracking the target. The surveying instrument may identify and track the target based on light emitted by the target. During tracking, the surveying instrument may lock onto the target, to follow the target during movement. The surveying instrument may for example be a total station, a geodetic scanner or any instrument combining the functions of a total station and a scanner, in particular a surveying instrument having a function for tracking of a target.

As the light sources emit light radially, not all light sources may be in a field of view of the surveying instrument at a given point in time. In other words, only some of the light sources (e.g. the first subset) may emit light toward the surveying instrument. Therefore the other light sources (e.g. the second subset) may emit light with a lower intensity, or be turned off, without affecting the interaction between the target and the surveying instrument. The first subset may include one or more of the plurality of light sources. The second subset may include one or more of the plurality of light sources.

The orientation of the target relative to the surveying instrument describes how the target is rotated relative to a position of the surveying instrument. The orientation of the target relative to the surveying instrument may for example be expressed as an angle between a reference direction of a target reference frame and a direction pointing towards the surveying instrument.

By obtaining information regarding the orientation of the target relative to the surveying instrument, which is aimed at the target, the control unit (and method) may determine which light sources of the plurality of light sources emit light in a direction towards the surveying instrument or are within a field of view of the surveying instrument.

Each of the light sources may have a defined position in the target. For example, each of the light sources may have a defined position in a target reference frame. The control unit may identify at least one first light source which is arranged to emit light towards the surveying instrument. The first light source may be included in the first subset of light sources. The first subset of light sources may include one or more light sources adjacent to the first light source. At least some of the light sources of the second subset may be arranged on a side of the base element opposite to the light sources of the first subset.

For example, the control unit may be configured to select a number of light sources for the first subset of light sources that correspond to a predetermined sector of the target (or that cover a predetermined field of view of the surveying instrument).

The control unit may control the plurality of light sources such that the second subset of light sources emit light with less than 50% of the intensity of the light emitted by the first plurality of light sources. More specifically, the control unit may control the plurality of light sources such that the second subset of light sources emit light with less than 25% of the intensity of the light emitted by the first plurality of light sources. Even more specifically, the control unit may control the plurality of light sources such that the second subset of light sources emit light with less than 10% of the intensity of the light emitted by the first plurality of light sources. Alternatively, the control unit may control the second plurality of light sources to be turned off.

Hence, with the present embodiments, only a subset of the light sources of the target may be turned on, or may be emitting light at a higher intensity, thereby resulting in a more energy efficient way of operating the target.

According to some embodiments, the sensor unit may comprise a plurality of sensors distributed around the longitudinal axis of the base element of the target. The plurality of sensors may be configured to detect a signal emitted by the surveying instrument toward the target. The information regarding the orientation of the target relative to the surveying instrument may be obtained by obtaining, from said plurality of sensors, a detection of a signal emitted by the surveying instrument toward the target. Obtaining the information may further comprise determining the orientation of the target relative to the surveying instrument based on a relative signal strength, of the signal, detected by the plurality of sensors.

In other words, the control unit may further be configured to obtain/receive, a detection of a signal emitted by the surveying instrument toward the target, from said plurality of sensors. The control unit may determine the orientation of the target relative to the surveying instrument based on a relative signal strength, of the signal, detected by the plurality of sensors.

The method may further comprise obtaining, from said plurality of sensors, a detection of a signal emitted by the surveying instrument toward the target and determining the orientation of the target relative to the surveying instrument based on a relative signal strength, of the signal, detected by the plurality of sensors.

The surveying instrument may for example comprise means for emitting an optical signal. The plurality of sensors may comprise sensors configured to detect an optical signal emitted by the surveying instrument. For example, the surveying instrument may comprise a laser, for example forming part of an electronic distance measurement (EDM) device. The surveying instrument may be configured to emit a laser beam toward the target. The laser beam may coincide with, or at least be parallel with, a sighting axis from the surveying instrument to the target.

The plurality of sensors may each have a known position in the target. Thus, by comparing a signal strength received at each (or at least some) of the sensors, a direction from which the signal was received may be determined. In other words, the orientation of the target relative to the surveying equipment may be determined based on a comparing a signal strength received by the plurality of sensors.

For example, the control unit may be configured to determine an orientation of the target relative to the surveying instrument based on which of the plurality of sensors detect the laser beam emitted by the surveying instrument.

According to some embodiments, the sensor unit may comprise at least one imaging sensor configured to obtain at least one image of a surrounding of the target. The information regarding the orientation of the target relative to the surveying instrument may be obtained by obtaining, from the at least one imaging sensor, at least one image of a surrounding of the target. Obtaining the information may further comprise identifying a surveying instrument in the obtained image and determining the orientation of the target relative to the surveying instrument based on a position of the identified surveying instrument in the obtained image.

According to some embodiments, the information regarding the orientation of the target relative to the surveying instrument may be obtained by receiving, from the surveying instrument, an input indicative of a surveying instrument orientation in a common reference frame. Obtaining the information may further comprise determining, based on measurements received from said sensor unit, a target orientation $$(A_Z^t)$$

in the common reference frame. Obtaining the information may further comprise determining, based on the received input and the determined target orientation, the orientation of the target relative to the surveying instrument.

The common reference frame may, e.g., be a local reference frame, a global reference frame or a surveying instrument reference frame.

As the surveying instrument is aimed at the target, the orientation of the target relative to the surveying instrument may be determined from the target orientation and the surveying instrument orientation in a same reference frame, such as the common reference frame.

According to some embodiments, the sensor unit may comprise a compass. The common reference frame may be a global reference frame. The determination of the target orientation in the common reference frame may comprise receiving a measurement from the compass. The determination of the target orientation may be based on the measurement from the compass.

The compass may for example provide an angle between a reference direction of a target reference frame and north.

According to some embodiments, the sensor unit may comprise an inertial measurement unit (IMU). The determination of the target orientation in the common reference frame may comprise determining a first position track of the target in a target reference frame based on measurements from the IMU. The determination may further comprise obtaining a second position track of the target in the common reference frame, based on a position input received from an external sender. The orientation of the target in the common reference may be determined by aligning the first position track with the second position track.

The position input may for example comprise a position track. Obtaining the second position track may comprise receiving the second position track as the position input.

The position input may comprise individual positions of the target, in the common reference frame, received over time or together. Obtaining the second position track may comprise determining the second position track based on a plurality of received positions of the target in the common reference frame.

Aligning the first and second position tracks may comprise rotating one of the position tracks relative to the other. A rotation of the target reference frame relative to the common reference frame may for example be obtained by rotating the first position track to align with the second position track. The alignment may further comprise scaling and/or translating one of the position tracks relative to other.

Often the position of the target is tracked over time, for example as an operator walks around with the target. The target may also be mounted on a vehicle, such as a rover, or on another object which position is of interest.

Once the orientation of the target reference frame relative to the common reference frame is determined, an orientation sensor, e.g. IMU or compass, or rotational velocity sensor may be used to track a rotation of the target as the target is moved to other positions. Thereby, the orientation of the target relative to the surveying instrument may be updated during movement of the target.

It will be appreciated that different types of orientation sensors, such as a compass and an IMU, may be used together to improve accuracy in the determination of the target orientation in the common reference frame.

According to some embodiments, the information regarding an orientation of the target relative to the surveying instrument may be obtained by receiving, from the surveying instrument, a position of the surveying instrument in the common reference frame. The obtaining may further comprise obtaining, based on a position input received from an external sender, a target position in the common reference frame. The obtaining may comprise determining, based on measurements received from the sensor unit, a target orientation in the common reference frame. The obtaining may further comprise determining the orientation of the target relative to the surveying instrument based on the position of the surveying instrument, the position of the target, and the target orientation in the common reference frame.

According to some embodiments, the sensor unit may comprise a global navigation satellite system (GNSS) receiver. The position input received from an external sender may comprise a target position input received via said GNSS receiver.

The external sender may be a global navigation satellite system in communication with the GNSS receiver.

According to some embodiments, the position input received from an external sender may comprise a target position input received from the surveying instrument.

It will be appreciated that position inputs received from the surveying instrument may be used together with position inputs received via the GNSS receiver to increase improve the accuracy of the positions and/or position tracks.

According to some embodiments, controlling the plurality of light sources may comprise controlling the second subset of light sources to be turned off.

According to some embodiments the plurality of light sources may comprise at least six light sources arranged symmetrically around the longitudinal axis of the base element.

For example, the plurality of light sources may comprise eight, ten or twelve light sources. The plurality of light sources may be arranged in one or more rows, or rings, around the longitudinal axis of the base element.

It is noted that other embodiments using all possible combinations of features recited in the above-described embodiments may be envisaged. Thus, the present disclosure also relates to all possible combinations of features mentioned herein. Further, advantages and explanations of features provided in more detail with reference to one of the aspects of the present disclosure apply mutatis mutandis to corresponding features of the other aspects of the disclosure. Unnecessary repetitions have been avoided for legibility and brevity of the disclosure. For example, descriptions of features and advantages provided in more detail with reference to the first aspect of the present disclosure apply mutatis mutandis to the second aspect of the present disclosure, and vice versa.

BRIEF DESCRIPTION OF DRAWINGS

Exemplifying embodiments will now be described in more detail, with reference to the following appended drawings:

FIG. 5 illustrates a first position track in a target reference frame;

FIG. 6 illustrates a second position track in a common reference frame;

FIG. 7 illustrates an alignment of the first position track and the second position track, and the relative orientation of the target reference frame and the common reference frame.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figures 1, 2:
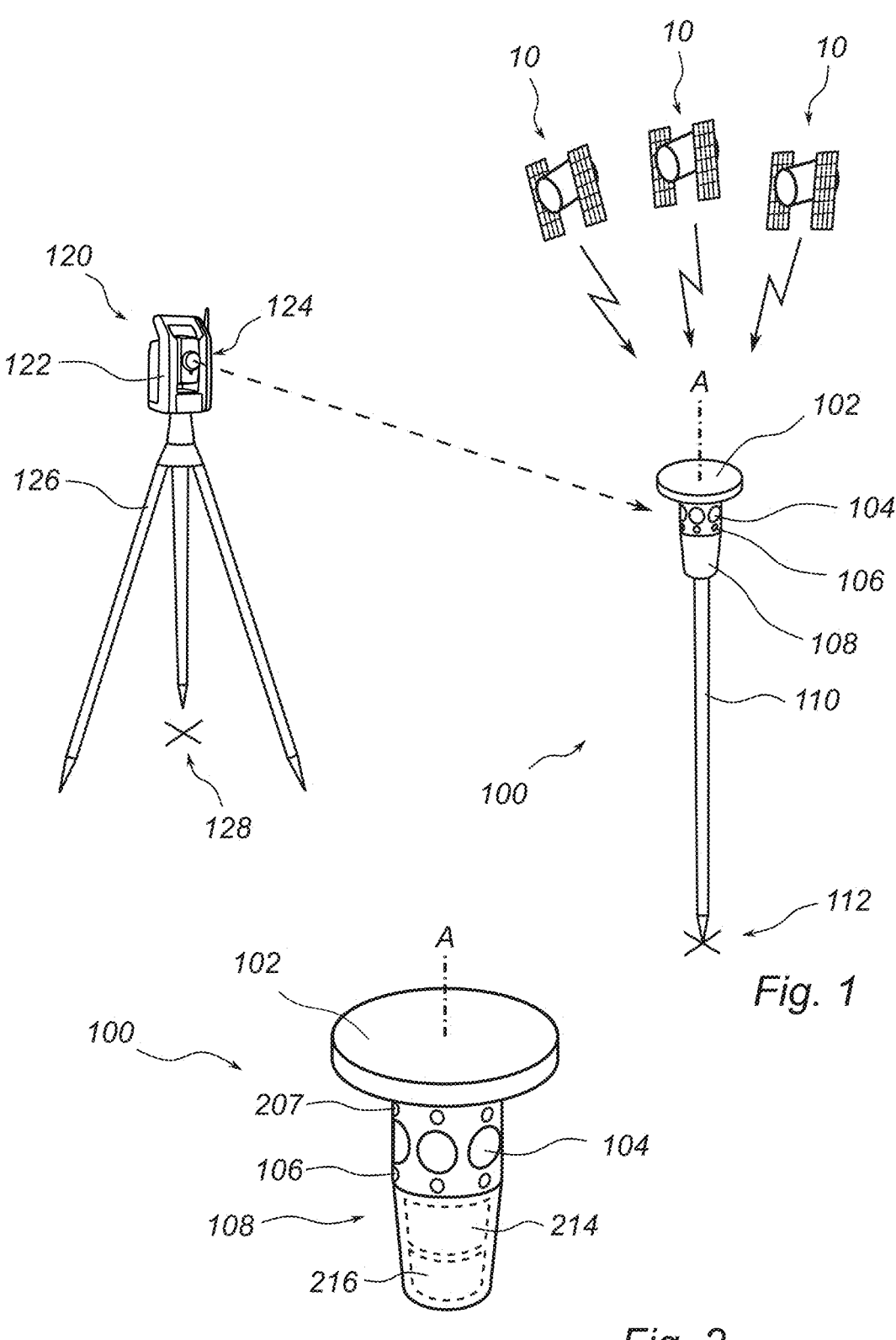
FIG. 1 illustrates a surveying system including a surveying instrument and a target, in accordance with some embodiments.
FIG. 2 illustrates a target, in accordance with some embodiments.

With reference to FIGS. 1 and 2 a surveying system including a target 100, in accordance with some embodiments, will be described.

FIG. 1 illustrates a surveying system in a typical operation setup. The surveying system comprises a target 100 and a surveying instrument 120. FIG. 2 illustrates the target 100 in further detail.

The target 100 includes a base element 108 having a longitudinal axis A. During operation, the target 100 may be arranged such that the longitudinal axis A is upright, or substantially vertical, or tilted by e.g. 10 or 45 deg. For this purpose, the target may be equipped with a tilt sensor (not shown) in order to position (or for the surveyor/operator to hold) the target with the axis A along a vertical direction (i.e. the local gravity direction) or in order to determine a tilt angle between the axis A and the vertical direction.

As is shown more clearly in FIG. 2, the target 100 comprises a plurality of light sources 106 arranged around the longitudinal axis A of the base element 108. Further, the target 100 comprises a plurality of reflective elements 104, also arranged around the longitudinal axis A of the base element 108. The plurality of reflective elements 104 are provided to reflect incident light. In FIGS. 1 and 2 the light sources 106 are shown as arranged below the reflective elements 104 and aligned with the reflective elements 104. However, it will be appreciated that other arrangements of the light sources 106 and the reflective elements 104 are possible. For example, the light sources 106 may be arranged in more than one row (or ring) around the longitudinal axis A, the light sources 106 may be arranged above the reflective elements 104, the number of light sources 106 may be different from the number of reflective elements 104, etc.

In FIG. 2, the target 100 further comprises a plurality of sensors 207 distributed around the longitudinal axis A. In the example embodiment illustrated in FIG. 2, the plurality of sensors 207 are arranged above the reflective elements 104 and aligned with the reflective elements 104 and the light sources 106. It will be appreciated that other arrangements of the reflective elements 104, the light sources 106 and the sensors 207 are possible.

The target 100 further comprises a control unit 214, configured to control a light output of the plurality of light sources 106, and a sensor unit 216 in communication with the control unit 214.

In FIG. 1, the target 100 is arranged on a pole 110 having a pointing tip, which may be placed on a measurement point 112 of interest. It will be appreciated that, in other embodiments, the target 100 may not be arranged on a pole 110. Instead, the target 100 may, for example, be arranged on a vehicle, such as a rover.

The target 100 further comprises an (optional) global navigation satellite system (GNSS) receiver 102. The GNSS receiver/antenna 102 may receive position data from a GNSS, illustrated by a plurality of satellites 10.

In FIG. 1, the surveying instrument 120 is arranged on a tripod 126, such that the surveying instrument is positioned above a point of reference 128. The point of reference 128 may have a known position in a common reference frame, such as a local coordinate system or a global coordinate system. The surveying instrument 120 includes a main element 122, including a light detector 124. The main element 122 further comprises an instrument control unit (not depicted). The main element 122 may further comprise one or more sensors (also not depicted). The main element 122 may for example be the center unit of a total station (the center unit being rotatably mounted on an alidade for rotation about a first axis, the alidade being itself rotatably mounted on a base of the total station for rotation about a second axis orthogonal to the first axis) or the scanning head of a geodetic scanner.

In a common surveying operation, the surveying instrument 120 may be configured to determine a position of the point of interest 112 in relation to the point of reference 128. For example, the surveying instrument 120 may include an electronic distance measurement (EDM) device (not depicted). The EDM may be configured to measure a distance between the target 100 and the surveying instrument 120. For example, the EDM may be configured to measure the distance based on a light beam emitted towards the target 100 and reflected back, at one of the reflective elements 104, towards the surveying instrument.

During operation, the surveying instrument 120 is aimed at the target 100, such that a sighting axis 130 is directed from the surveying instrument 120 to the target 100. The plurality of light sources 106 are arranged to emit light radially, i.e., in directions away from the longitudinal axis A. The light detector 124 of the surveying instrument 120 is configured to detect light emitted by the plurality of light sources 106. The instrument control unit may be configured to determine whether the instrument 120 is aimed at the target 100 based on an input from the light detector 124. The light detector 124 may be configured to provide said input if light emitted by the plurality of light sources 106 is detected.

However, as the light sources 106 emit light radially, only some (or even one) of the light sources 106 will emit light towards the surveying instrument 120. The light source or the light sources of the target that emit light towards the surveying instrument depend on the orientation of the target relative to the surveying instrument. The present disclosure provides a target and a method for operating a target, which may optimize power consumption at the target by controlling a light output of the plurality of light sources such that light sources arranged to emit light towards the surveying instrument emit light with a higher intensity than light sources arranged to emit light in other directions, such as away from the surveying apparatus.

Figure 3:
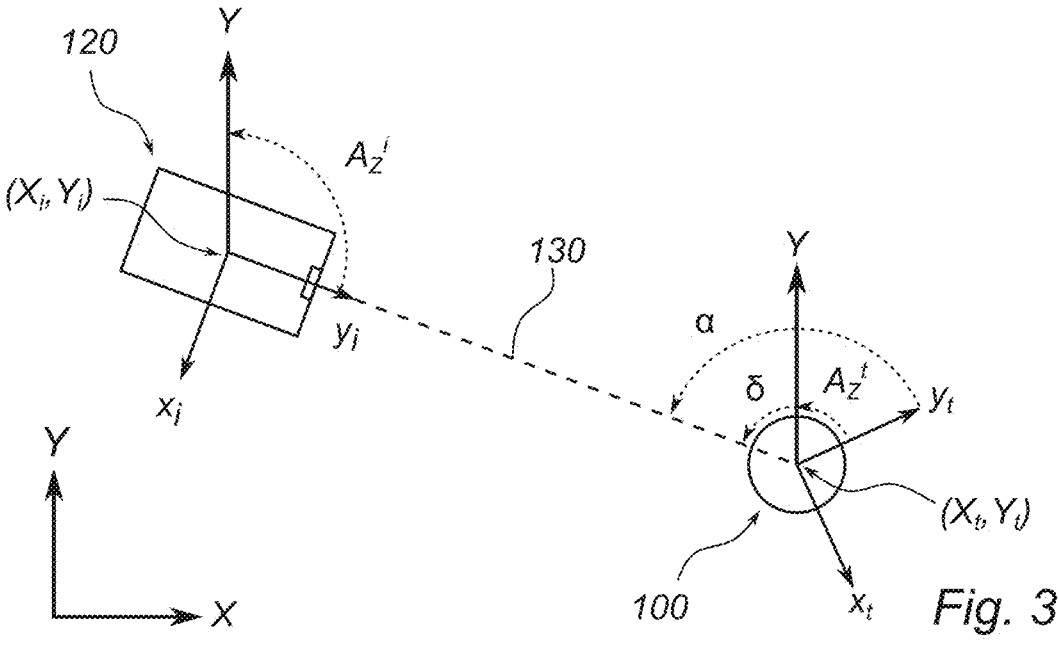
FIG. 3 illustrates a surveying system viewed from above, in accordance with some embodiments.
Figure 4:
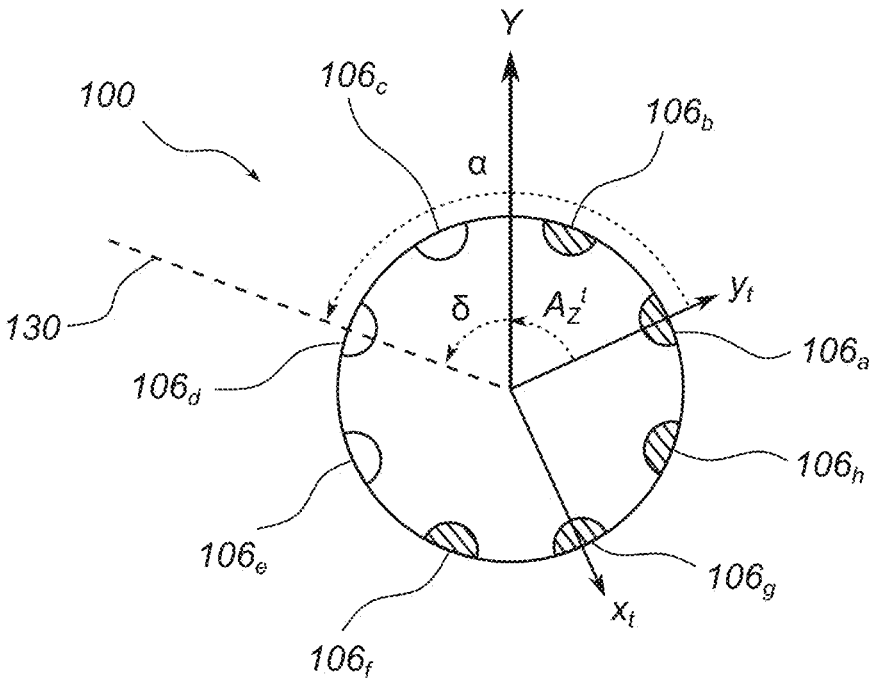
FIG. 4 illustrates a cross section of a target, in accordance with some embodiments.

With further reference to FIGS. 3 and 4, as well as FIGS. 1 and 2, details of the operation of the target and the surveying instrument will be provided.

The details will be provided as operational tasks performed by the surveying instrument 120 and the target 100, or specifically by their control units. It will be appreciated that the operational tasks may be expressed as steps of a method.

FIG. 3 is an illustration, viewed from above, of a surveying system in a typical operation setup, such as the setup shown in FIG. 1. FIG. 4 illustrates a cross section of the target 100 in further detail.

In FIG. 3, a common reference frame is illustrated as a coordinate system (X, Y). The target 100 is also illustrated as having a target reference frame $(x_t, y_t)$, including a target reference direction $y_t$. The surveying instrument 120 has an instrument reference frame $(x_i, y_i)$, including an instrument reference direction $y_i$. The instrument reference direction $y_i$ aligns with the sighting axis 330 indicating an aiming direction of the instrument 120.

Upon determination that the instrument 120 is aimed towards the target 100, the instrument control unit may determine an orientation $$A_Z^i$$

of the surveying instrument in the common reference frame (X, Y). In FIG. 3, the orientation of the surveying instrument in the common reference frame (X, Y) is indicated by an angle $$A_Z^i$$

between the instrument reference frame $(x_i, y_i)$ and the common reference frame (X, Y).

The target control unit 214 may obtain information regarding an orientation $\alpha$ of the target 100 relative to the surveying instrument 120 based on at least a measurement received from the sensor unit 216. In FIG. 3, the orientation $\alpha$ of the target 100 relative to the surveying instrument is illustrated as an angle between the sighting axis 130 and a reference direction $y_t$ of the target reference frame $(x_t, y_t)$.

As illustrated in FIG. 2, the target 100 may comprise a plurality of sensors 207 distributed around the longitudinal axis A of the base element 108. The sensors 207 may be configured to detect a signal emitted by the surveying instrument 120 toward the target 100. For example, the sensors 207 may be configured to detect an optical signal, such as a laser beam, emitted by the surveying instrument 120 toward the target 100. The control unit 214 may be configured to determine a direction from which the signal is received, based on a relative intensity of the signal detected by the sensors 207.

For example, the surveying instrument 120 may emit a signal, such as an optical signal, along the sighting axis 130, towards the target 100. The signal may reach the target 100 along the sighting axis 130, at an angle $\alpha$ from the target reference direction $y_t$. In the example illustrated in FIG. 4, a sensor 207 aligned with the light source 106d, would therefore provide a stronger detection of the signal than a sensor 207 arranged further from the sighting axis 130. The control unit 214 may compare the signal strengths detected by each of the sensors 207 to determine the orientation $\alpha$ of the target 100 relative to the surveying instrument 120.

The sensor unit 216 may comprise at least one imaging sensor configured to obtain at least one image of a surrounding of the target 100. The imaging sensor could for example comprise a panoramic camera covering a 360 degree field of view, or multiple cameras together covering a 360 degree field of view. The control unit 214 may identify the surveying instrument 120 in the obtained image and determine the orientation $\alpha$ of the target 100 relative to the surveying instrument 120 based on a position of the identified surveying instrument in the obtained image.

In some embodiments, the target control unit 214 may receive, from the surveying instrument, an input indicative of the orientation $$A_Z^i$$

of the surveying instrument in the common reference frame (X, Y).

An instrument control unit may for example determine the orientation $$A_Z^i,$$

based on measurements received from at least one sensor of the surveying instrument 120. For example, the surveying instrument may comprise an orientation sensor, such as an IMU, a compass, or an angular measurement unit.

The instrument control unit may transmit the orientation $$A_Z^i$$

of the surveying instrument in the common reference frame (X, Y) to the target 100.

The target control unit 214 may determine an orientation $$A_Z^t$$

of the target 100 in the common reference frame (X, Y). In FIG. 3, the orientation of the target in the common reference frame (X, Y) is indicated by an angle $$A_Z^t$$

between the target reference frame $(x_t, y_t)$ and the common reference frame (X, Y). The determination of the target orientation $$A_Z^t$$

may be done in different ways, which will be explained further below.

Based on the received input $$A_Z^i$$

and the determined target orientation $$A_Z^t,$$

the target control unit 214 may determine the orientation $\alpha$ of the target relative to the surveying instrument 120.

For example, in FIG. 3, the direction a towards the surveying instrument 120 may be determined as follows:

$$\left. \begin{array}{l} A_Z^i + \delta = 180° \\ \alpha = A_Z^t + \delta \end{array} \right\} \alpha = 180° - A_Z^i + A_Z^t$$

In some embodiments, the target 100 control unit 214 may receive, from the surveying instrument 120 a position $(X_i, Y_i)$ of the surveying instrument 120 in the common reference frame (X, Y). The control unit 214 may receive a position input from an external sender and obtain a position $(X_t, Y_t)$ of the target 100 in the common reference frame (X, Y), based on the received position input. The sensor unit 214 may receive a measurement from the sensor unit and determine the target orientation $$(A_Z^t)$$

in the common reference frame based on the measurement from the sensor unit. Knowing the position $(X_i, Y_i)$ of the surveying instrument 120, the position $(X_t, Y_t)$ of the target 100 and the target orientation $$(A_Z^t),$$

all in the common reference frame (X, Y), the control unit 214 may determine the orientation $\alpha$ of the target relative to the surveying instrument.

In some embodiments, the external sender may comprise a Global Navigation Satellite System (GNSS), as illustrated by the plurality of satellites 10 in FIG. 1. The control unit 214 may receive the position input via the GNSS receiver 102 illustrated in FIGS. 1 and 2.

In some embodiments, the external sender may comprise the surveying instrument 120. As mentioned above, the surveying instrument 120 may be configured to determine a position of the point of interest 112 relative to the reference point 128. In other words, the surveying instrument 120 may determine the position $(X_i, Y_i)$ of the surveying instrument 120 in the common reference frame (X, Y).

When the orientation $\alpha$ of the target relative to the surveying instrument 120 has been determined, the control unit 214 may identify, based on the determined orientation $\alpha$, a first subset of the plurality of light sources arranged to emit light towards the surveying instrument.

FIG. 4 is a close-up view of the target 100 shown in FIG. 3. In FIG. 4, the light sources 106*a-h* are numbered in relation to their position in the target. Specifically, the light sources 106*a-h* are numbered in relation to their position in the target reference frame $(x_t, y_t)$. The light sources are numbered sequentially in a counter-clockwise direction starting with a light source 106*a* aligned with the target reference direction $y_t$.

The individual light sources 106*a-h* may each have a fixed position, in the target reference frame $(x_t, y_t)$, known to the target control unit 214 (for example from the design or manufacturing of the target). When the orientation $\alpha$ of the target 100 relative to the surveying instrument 120 is determined, the target control unit 214 may identify a first light source 106*d* which is arranged closest to the sighting axis 130. The control unit 214 may further identify a first subset 106*c-e* of the plurality of light sources arranged to emit light towards the surveying instrument 120. In FIG. 4, the subset includes the first light source 106*d* and its two neighbouring light sources 106*c*, 106*e*. Depending on the total number of light sources, and their positions around the base element 108, the first subset may comprise more or fewer light sources 106. The control unit may for example be configured to select a number of light sources for the first subset based on a predetermined sector to cover by the light emitted from the light sources (or coverage angle expressed for example in %, like 25%, or an angle, like 45°.

The control unit 214 may further identify a second subset 106*a-b*, 106 *f-h* of the plurality of light sources which are arranged to emit light in directions away from the surveying instrument 120, or at least not towards the surveying instrument 120.

The control unit 214 may further control the plurality of light sources 106 such that the first subset 106*c-e* of light sources emit light with a higher intensity than the second subset 106*a-b*, 106 *f-h* of light sources. For example, the control unit 214 may control the first subset 106*c-e* of light sources to be turned on, and the second subset 106*a-b*, 106 *f-h* of light sources to be turned off.

As mentioned above, the determination of the target orientation $A_Z^t$ may be done in different ways. For example, the target 100 may comprise one or more sensors in a sensor unit 216. The target may comprise an orientation sensor such as a compass or an IMU.

In embodiments in which the target 100 comprises a compass, the common reference frame (X, Y) may be a global reference frame with north as a reference direction. The compass may provide the target orientation $$A_Z^t,$$

in the common reference frame (X, Y), as an angle between the target reference frame $(x_t, y_t)$ and north.

Alternatively, or additionally, the target 100 may comprise an inertial measurement unit (IMU).

With reference to FIGS. 5-7 a method for determining the orientation $$A_Z^t$$

of the target 100 based in part on measurements from an IMU will be described.

The control unit 214 may determine a first position track 540, as illustrated in FIG. 5, based on measurements from the IMU. The control unit 214 may determine a plurality of positions $P_{t1}-P_{t7}$ of the target 100 in the target reference frame $(x_t, y_t)$, based on measurements from the IMU, as the target 100 is moved. The movement of the target 100 may be in accordance with a calibration pattern. Alternatively, the movement of the target 100 may be part of a measurement operation. The plurality of (ordered/sequential) positions $P_{t1}-P_{t7}$ of the target may form a first position track 540.

FIG. 6 illustrates a second position track 642 of the target 100 in a common reference frame (X, Y). The second position track 642 comprises a plurality of positions $P_1-P_7$ of the target in the common reference frame (X, Y). The control unit 214 may obtain the second position track 642 based on a position input received from an external sender. The position input may for example comprise a plurality of individual positions, or a position track.

In some embodiments, the external sender may comprise a Global Navigation Satellite System (GNSS), as illustrated by the plurality of satellites 10 in FIG. 1. The control unit 214 may receive the position input via the GNSS receiver 102 illustrated in FIGS. 1 and 2.

In some embodiments, the external sender may comprise the surveying instrument 120. As mentioned above, the surveying instrument 120 may be configured to determine a position of the point of interest 112 relative to the reference point 128. The surveying instrument 120 may comprise an EDM device configured to measure a distance between the target 100 and the surveying instrument 120. Based on the orientation of the surveying instrument 120 in the common reference frame (X, Y) and a measurement received from the EDM device, the instrument control unit may determine a position of the target in the common reference frame (X, Y). The position of the target in the common reference frame may be relative to the position of the surveying instrument, or an absolute position in a local or global common reference frame. The instrument control unit may transmit the determined target position to the target 100. The target control unit 214 may determine the second position track 642 based on a plurality of target positions received from the surveying instrument 120. Alternatively, the instrument controller may determine a second position track 642 and transmit the second position track 642 to the target 100.

The control unit 214 may determine the orientation $$A_Z^t$$

of the target 100 in the common reference frame (X, Y) by aligning the first position track 540 and the second position track 642. FIG. 7 illustrates the first position track 540 aligned with the second position track 642. For illustrative purposes, the positions $P_{t1}$-$P_{t7}$ of the first position track 540 and the positions $P_1$-$P_7$ of the second position track 642 have been determined at the same points in time, such that the positions coincide in FIG. 7. The alignment illustrated in FIG. 7 comprises a rotation of the first position track 540 to align with the second position track 642. This corresponds to a rotation of the target reference frame ($x_t$, $y_t$). The rotation of the target reference frame ($x_t$, $y_t$) in relation to the common reference frame (X, Y) provides, in FIG. 7, the orientation $$A_Z^t$$

of the target 100 in the common reference frame (X, Y).

In some embodiments, the control unit 214 may transmit the first position track to an external control unit (not depicted). The external control unit may obtain the second position track and perform the alignment of the position tracks. The control unit 214 may receive the orientation of the orientation $$A_Z^t$$

of the target 100 in the common reference frame from the external control unit. The external control unit may be the instrument control unit, or a control unit separate from the target and the surveying instrument.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A target for use in surveying applications, the target comprising:
   a plurality of light sources arranged around a longitudinal axis of a base element of said target and configured to emit light radially;
   a sensor unit; and
   a control unit configured to:
      obtain information regarding an orientation of said target relative to a surveying instrument aimed at said target, based on at least a measurement received from said sensor unit;
      identify, based on the obtained information regarding the orientation of the target relative to the surveying instrument, a first subset of the plurality of light sources arranged to emit light towards the surveying instrument, and a second subset of the plurality of light sources arranged to emit light away from the surveying instrument; and
      control the plurality of light sources such that the first subset of light sources emit light with a higher intensity than the second subset of light sources.

2. A method for operating a target for use in surveying applications, the target comprising a plurality of light sources arranged around a longitudinal axis of a base element of said target and configured to emit light radially, the method comprising:
   obtaining information regarding an orientation of said target relative to a surveying instrument aimed at said target based on at least a measurement received from a sensor unit of the target;
   identifying, based on the obtained information regarding the orientation of the target relative to the surveying instrument, a first subset of the plurality of light sources arranged to emit light towards the surveying instrument, and a second subset of the plurality of light sources arranged to emit light away from the surveying instrument; and
   controlling the plurality of light sources such that the first subset of light sources emit light with a higher intensity than the second subset of light sources.

3. The target of claim 1, wherein:
   said sensor unit comprises a plurality of sensors distributed around the longitudinal axis of the base element of the target, and configured to detect a signal emitted by the surveying instrument.

4. The target of claim 1, wherein:
   said sensor unit comprises at least one imaging sensor configured to obtain at least one image of a surrounding of the target.

5. The method of claim 2, wherein the information regarding the orientation of the target relative to the surveying instrument is obtained by:
   receiving, from the surveying instrument, an input indicative of a surveying instrument orientation in a common reference frame;
   determining, based on measurements received from said sensor unit, a target orientation in the common reference frame; and
   determining, based on the received input and the determined target orientation in the common reference frame, the orientation of the target relative to the surveying instrument.

6. The target of claim 1, wherein:
said sensor unit comprises a compass.

7. The target of claim 1, wherein:
said sensor unit comprises an inertial measurement unit, IMU.

8. The method of claim 2, wherein:
the information regarding an orientation of the target relative to the surveying instrument obtained by:
    receiving, from the surveying instrument, a position of the surveying instrument in a common reference frame;
    obtaining, based on a position input received from an external sender, a position of the target in the common reference frame;
    determining, based on measurements received from said sensor unit, a target orientation in the common reference frame; and
    determining the orientation of the target relative to the surveying instrument based on the position of the surveying instrument, the position of the target, and the target orientation, in the common reference frame.

9. The target of claim 1, wherein:
said sensor unit comprises a global navigation satellite system, GNSS, receiver.

10. The method of claim 8, wherein
said position input received from an external sender comprises a target position input received from said surveying instrument.

11. The method of claim 2, wherein the control of the plurality of light sources comprises controlling the second subset of light sources to be turned off.

12. The target of claim 1, wherein said plurality of light sources comprises at least six light sources arranged symmetrically around the longitudinal axis of the base element.

13. The method of claim 2, wherein said sensor unit comprises a plurality of sensors distributed around the longitudinal axis of the base element of the target, configured to detect a signal emitted by the surveying instrument, and the information regarding the orientation of the target relative to the surveying instrument is obtained by:
    obtaining, from said plurality of sensors, a detection of a signal emitted by the surveying instrument toward the target; and determining the orientation of the target relative to the surveying instrument based on a relative signal strength, of the signal, detected by the plurality of sensors.

14. The method of claim 2, wherein said sensor unit comprises at least one imaging sensor configured to obtain at least one image of a surrounding of the target, and the information regarding the orientation of the target relative to the surveying instrument is obtained by:
    obtaining, from the at least one imaging sensor, at least one image of a surrounding of the target;
    identifying a surveying instrument in the obtained image; and
    determining the orientation of the target relative to the surveying instrument based on a position of the identified surveying instrument in the obtained image.

15. The method of claim 2, wherein said sensor unit comprises a compass, a common reference frame is a global reference frame, and the determination of the target orientation in the common reference frame comprises:
    receiving a measurement from the compass; and
    determining the target orientation in the common reference frame based on the measurement from the compass.

16. The method of claim 2, wherein said sensor unit comprises an inertial measurement unit, IMU, and the determination of the target orientation in a common reference frame comprises:
    determining a first position track of the target, in a target reference frame, based on measurements from said IMU;
    obtaining a second position track of the target, in the common reference frame, based on a position input received from an external sender; and
    determining the target orientation in the common reference frame by aligning said first position track and said second position track.

17. The method of claim 8, wherein said sensor unit comprises a global navigation satellite system, GNSS, receiver, and wherein said position input received from an external sender comprises a target position input received via said GNSS receiver.

* * * * *